United States Patent
Chun et al.

(10) Patent No.: US 10,504,488 B2
(45) Date of Patent: Dec. 10, 2019

(54) PORTABLE DEVICE AND CONTROL METHOD THEREFOR

(71) Applicant: LG ELECTRONICS INC., Seoul (KR)

(72) Inventors: Sinae Chun, Seoul (KR); Sihwa Park, Seoul (KR); Juhwan Lee, Seoul (KR); Doyoung Lee, Seoul (KR)

(73) Assignee: LG ELECTRONCS INC., Seoul (KR)

( * ) Notice: Subject to any disclaimer, the term of this patent is extended or adjusted under 35 U.S.C. 154(b) by 290 days.

(21) Appl. No.: 15/519,367

(22) PCT Filed: Oct. 15, 2014

(86) PCT No.: PCT/KR2014/009672
§ 371 (c)(1),
(2) Date: Apr. 14, 2017

(87) PCT Pub. No.: WO2016/060291
PCT Pub. Date: Apr. 21, 2016

(65) Prior Publication Data
US 2017/0229100 A1 Aug. 10, 2017

(51) Int. Cl.
*G09G 5/14* (2006.01)
*G09G 5/38* (2006.01)
(Continued)

(52) U.S. Cl.
CPC ............. *G09G 5/14* (2013.01); *G06F 1/1616* (2013.01); *G06F 1/1641* (2013.01);
(Continued)

(58) Field of Classification Search
CPC combination set(s) only.
See application file for complete search history.

(56) References Cited

U.S. PATENT DOCUMENTS

2010/0064244 A1* 3/2010 Kilpatrick, II ........ G06F 1/1616
715/773
2011/0241998 A1 10/2011 McKinney et al.

FOREIGN PATENT DOCUMENTS

| KR | 10-2014-0001376 A | 1/2014 |
| KR | 10-2014-0094333 A | 7/2014 |
| WO | WO 2012/108668 A2 | 8/2012 |

* cited by examiner

*Primary Examiner* — Deeprose Subedi
(74) *Attorney, Agent, or Firm* — Birch, Stewart, Kolasch & Birch, LLP

(57) ABSTRACT

A control method for a portable device comprising a first body at the center, a second body located at one side of the first body and a third body located at the other side of the first body, according to one embodiment of the present specification, can comprises the steps of: detecting a first folded state in which the second body and the first body are folded on the basis of a first folding axis, the third body is folded with the first body, and a second display area is located in the front direction of the portable device; displaying a first application on the second display area in the first folded state; detecting the occurrence of an event related to a second application other than the first application in a state in which the first application is displayed; and displaying first visual information of the event on a partial region of a third display area while continuously displaying the first application on the second display area if it is detected that a first folding angle between the first body and the third body is changed on the basis of a second folding axis.

18 Claims, 14 Drawing Sheets

(51) Int. Cl.
  *G06F 1/16* (2006.01)
  *G06F 3/0481* (2013.01)
  *G06F 3/14* (2006.01)
  *G06F 3/0483* (2013.01)
(52) U.S. Cl.
  CPC .......... *G06F 1/1647* (2013.01); *G06F 1/1652* (2013.01); *G06F 1/1677* (2013.01); *G06F 3/0481* (2013.01); *G06F 3/0483* (2013.01); *G06F 3/1423* (2013.01); *G09G 5/38* (2013.01); *G09G 2340/0407* (2013.01); *G09G 2340/0464* (2013.01)

FIG. 4
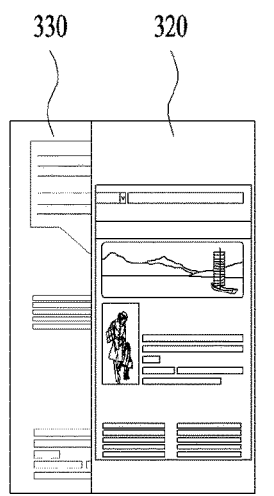
< Fronr View >
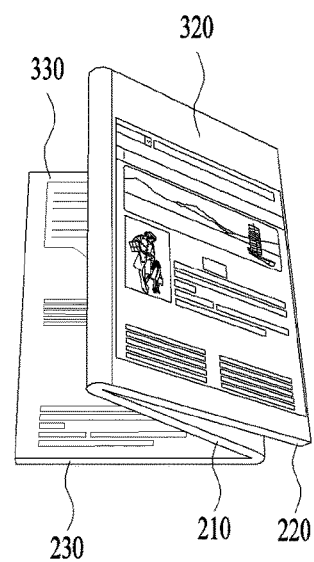
< Side View >

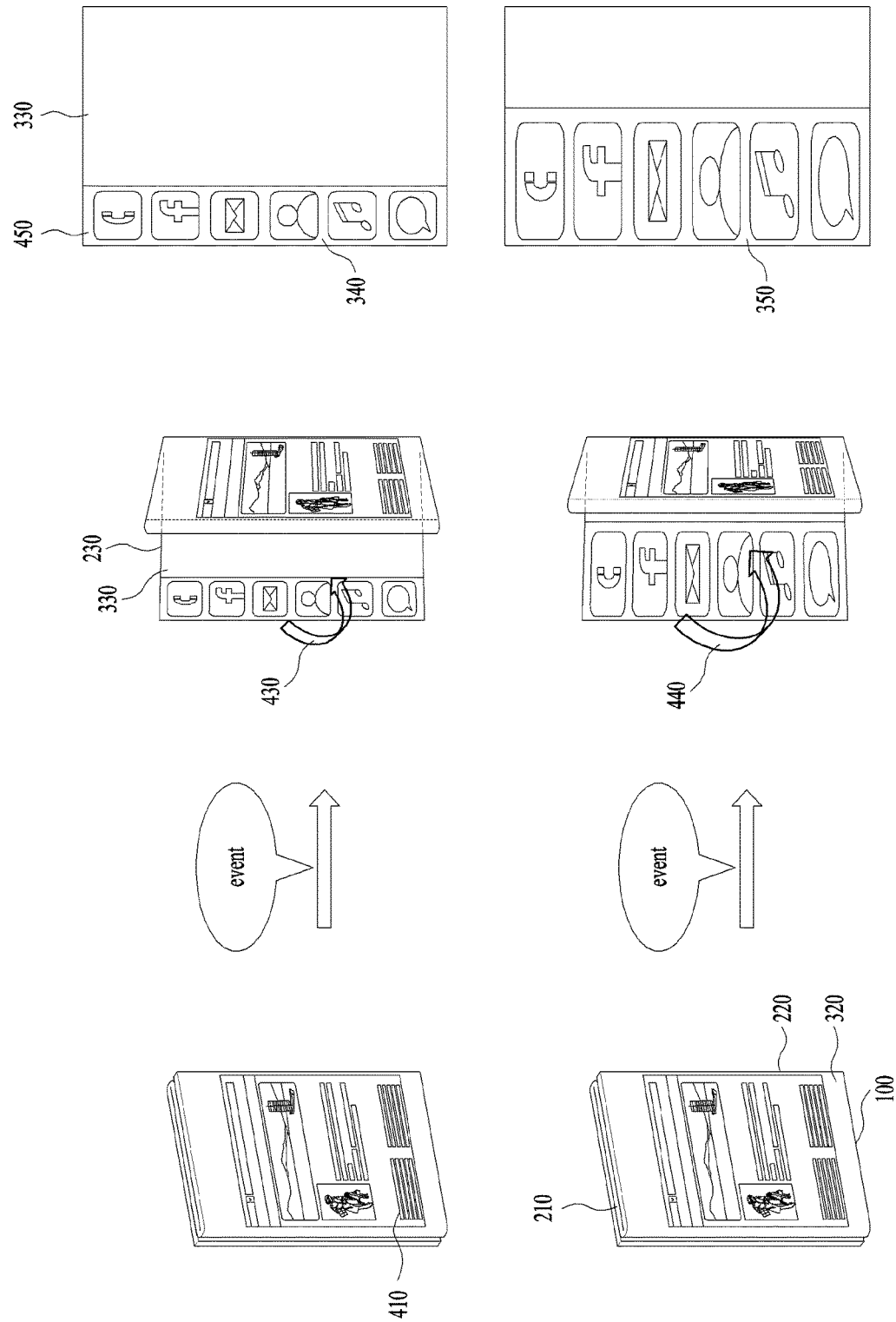

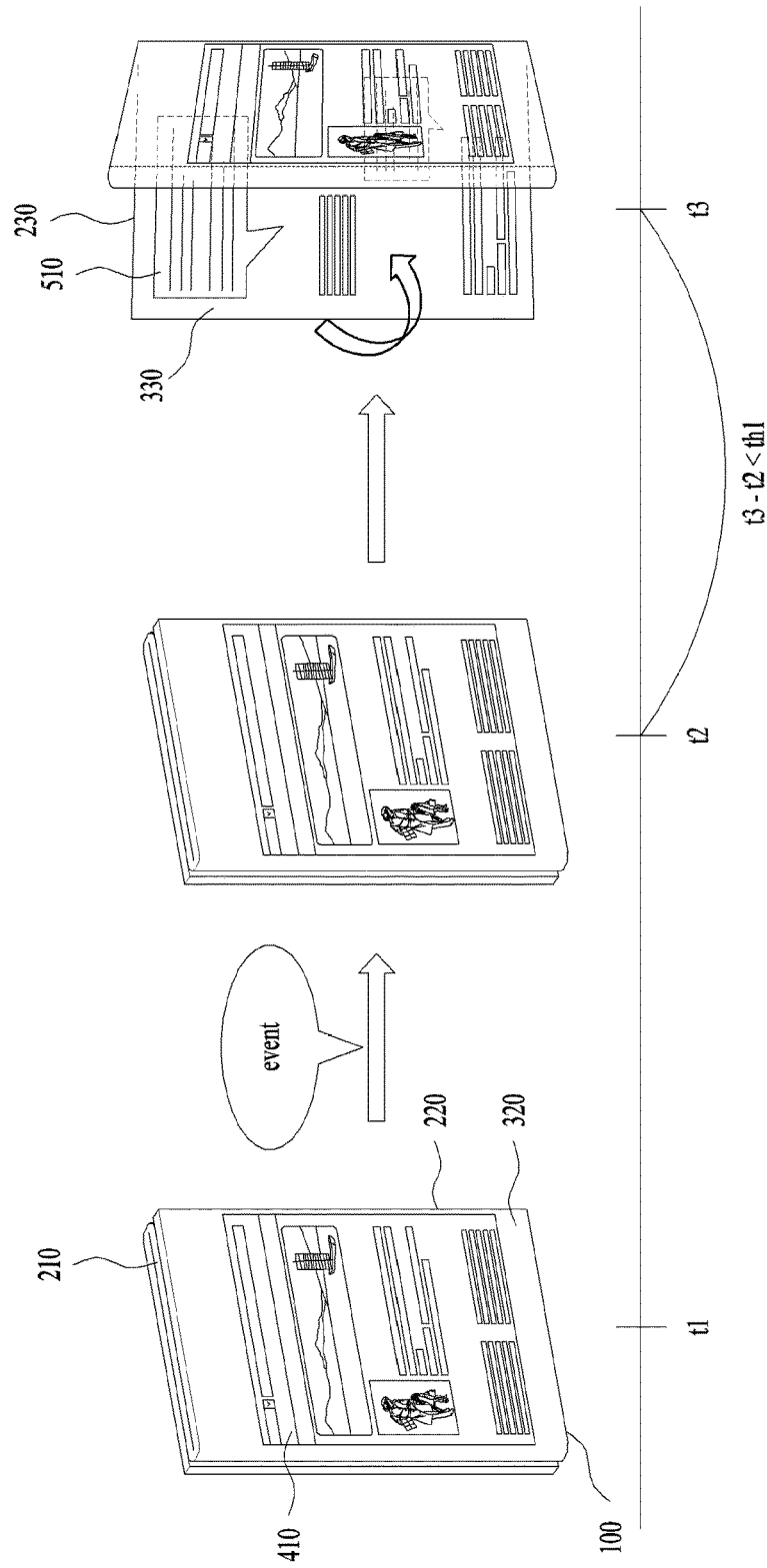

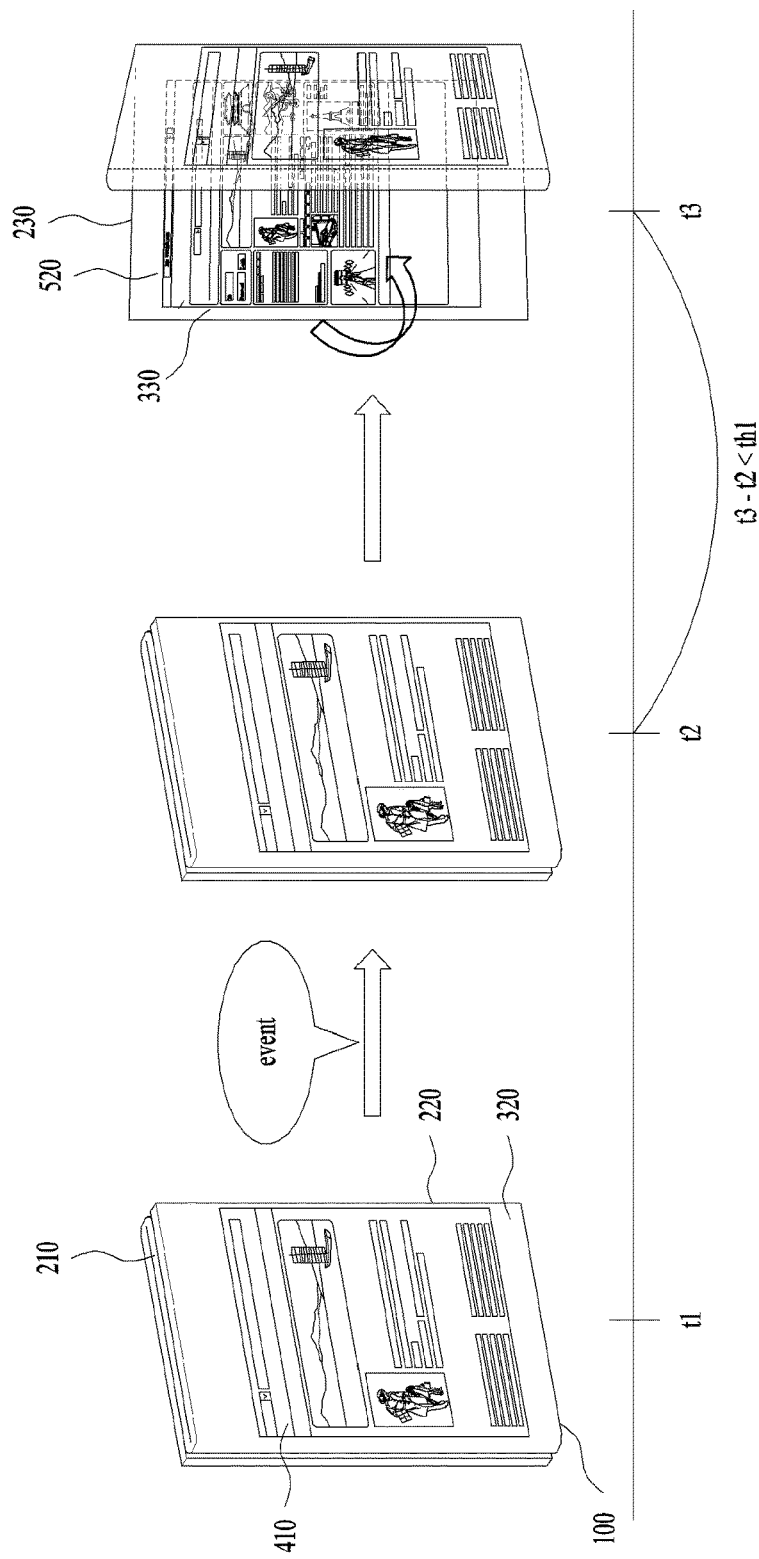

FIG. 7
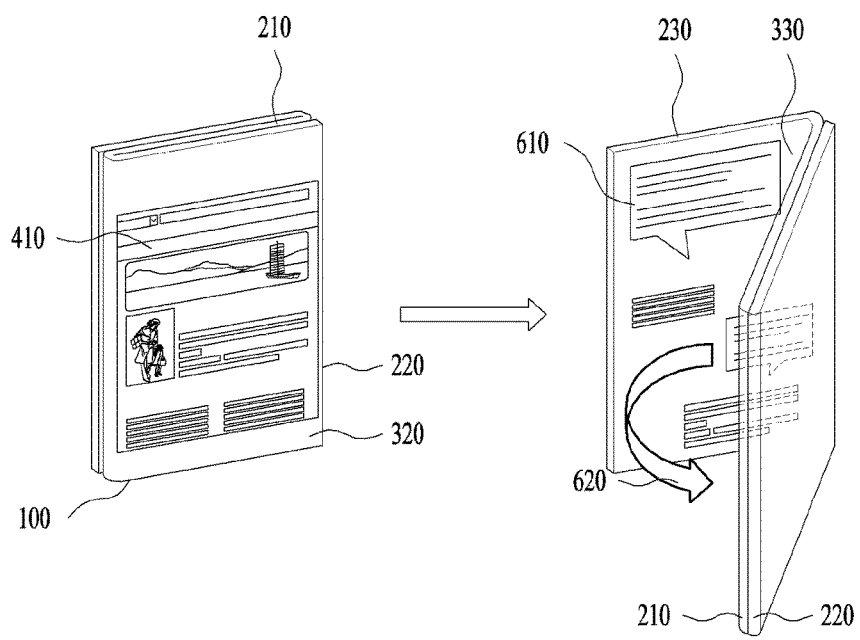
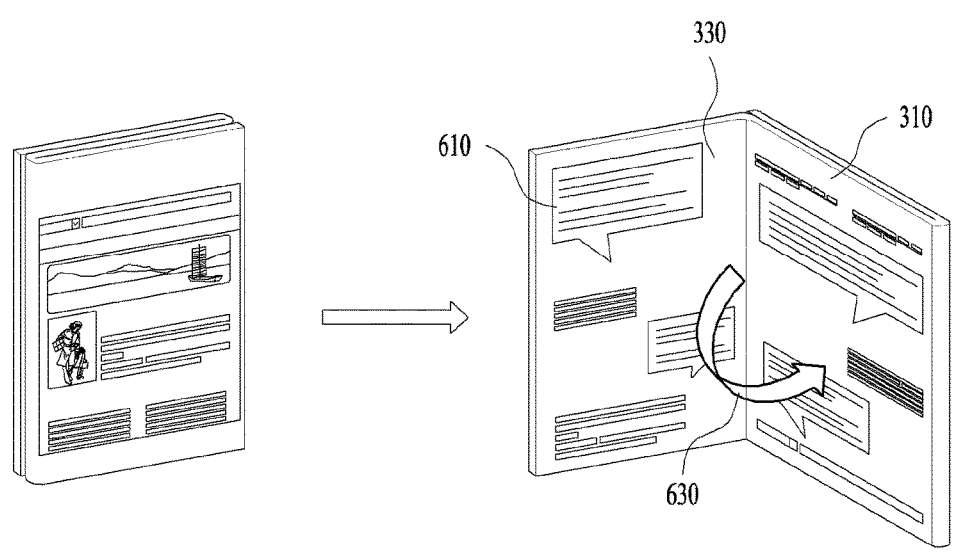

FIG. 8
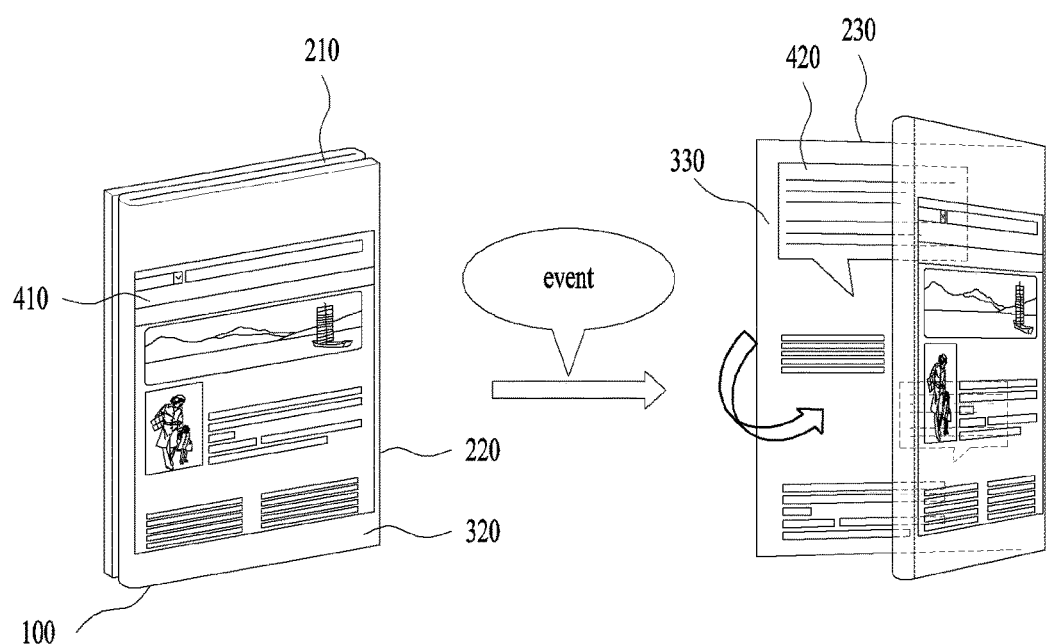
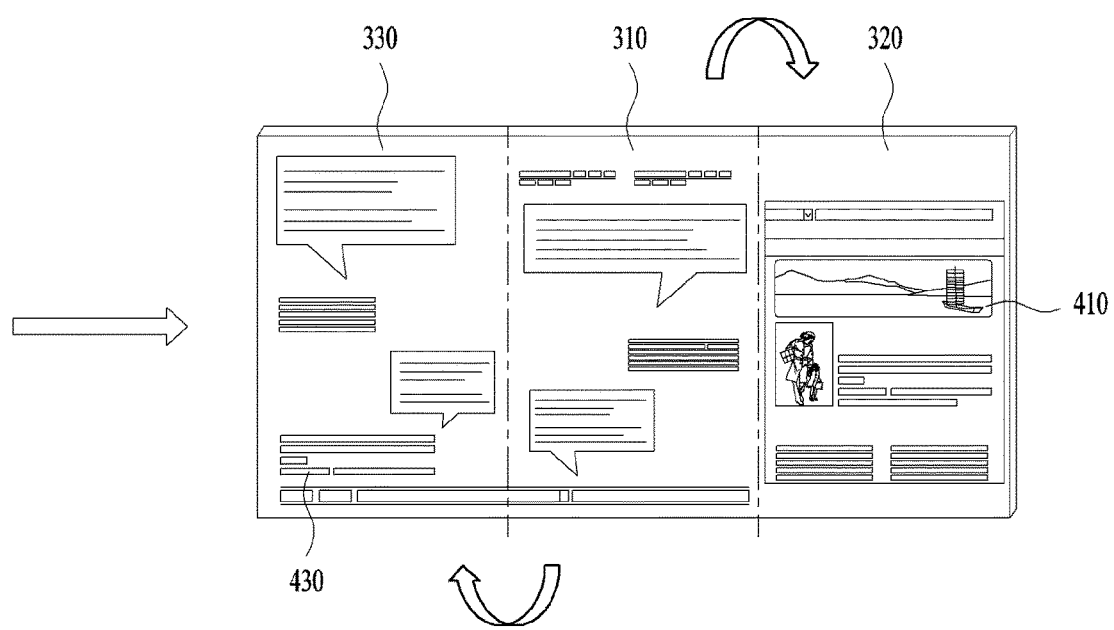

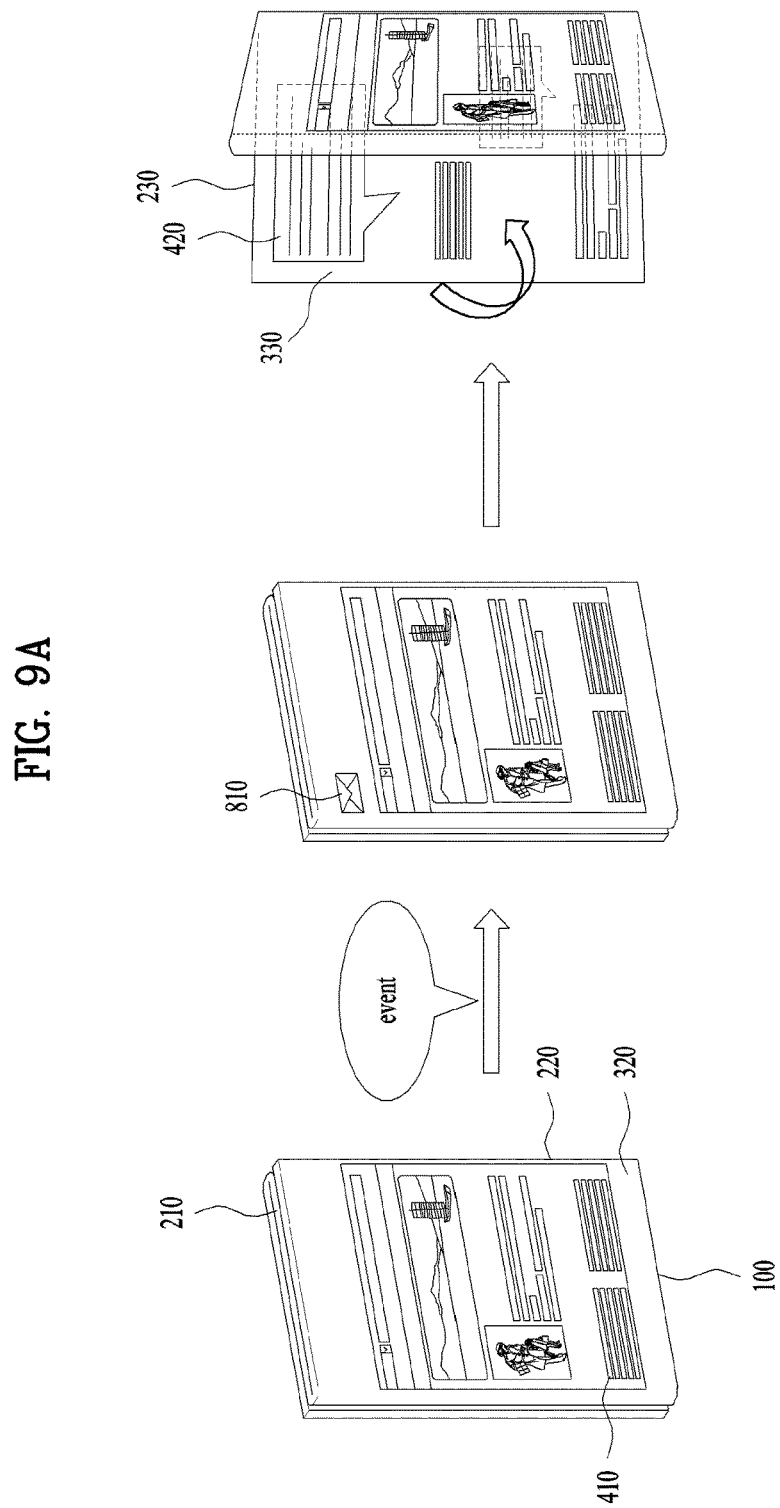

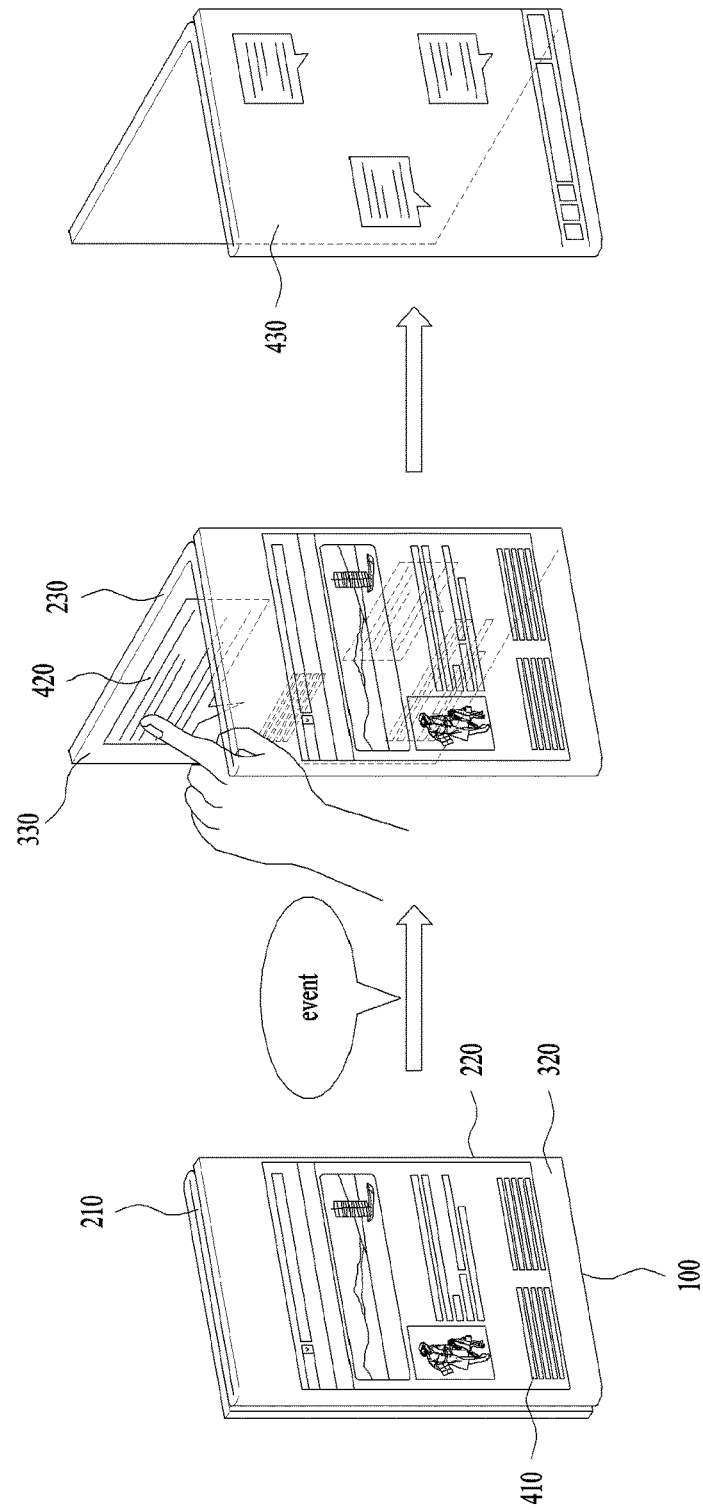

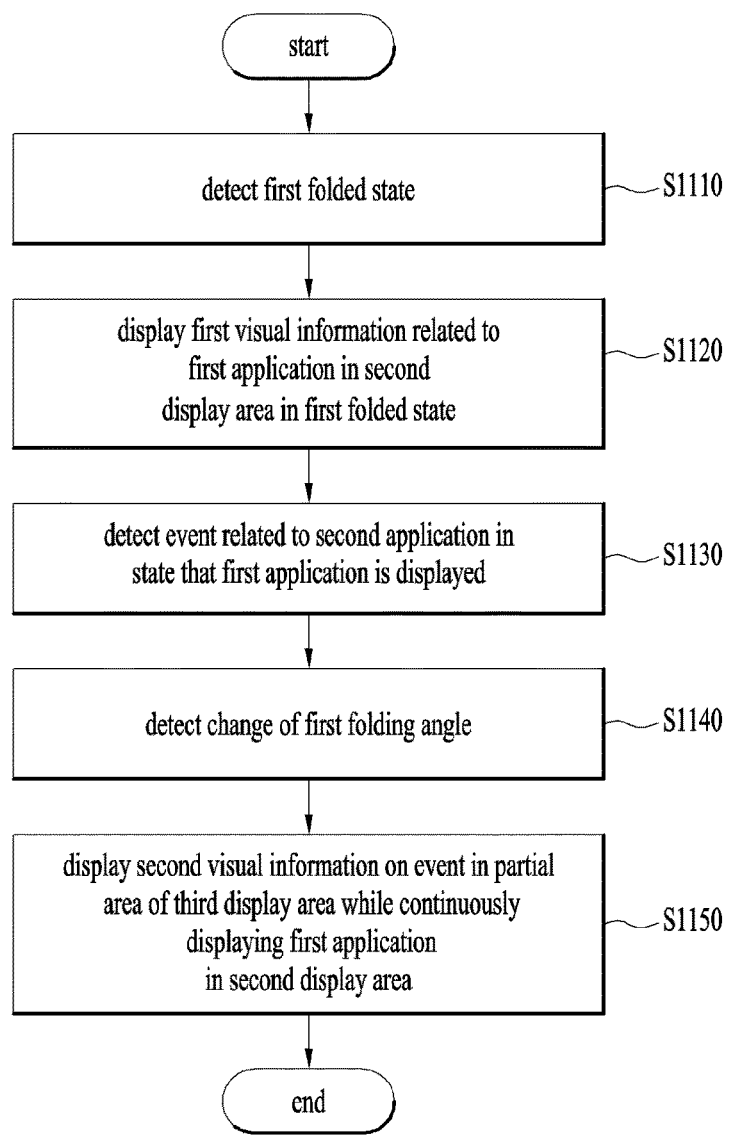

PORTABLE DEVICE AND CONTROL METHOD THEREFOR

CROSS REFERENCE TO RELATED APPLICATIONS

This application is the National Phase of PCT International Application No. PCT/KR2014/009672, filed on Oct. 15, 2014, all of which are hereby expressly incorporated by reference into the present application.

TECHNICAL FIELD

The present invention relates to a portable device and a method of controlling therefor.

BACKGROUND ART

The use of a portable device equipped with a flexible display is increasing. In this case, the portable device equipped with the flexible display can provide a user with a wide screen. At the same time, the portable device equipped with the flexible display may have a foldable structure. With the help of the foldable structure, portability of the portable device can be enhanced. Recently, a portable device including three foldable bodies is proposed. In this case, the portable device may operate in a state that all bodies are folded. And, the portable device may operate in a state that all bodies are unfolded. In this case, an operation method of the portable device can be differently configured according to a folded state of the body. Hence, it is necessary to have a method of controlling the operation method.

DISCLOSURE OF THE INVENTION

Technical Tasks

One object of the present specification is to provide a portable device and a method of controlling therefor.

Another object of the present specification is to provide a portable device having a structure including a first body located at the center, a second body located at one side of the first body, and a third body located at another side of the first body.

Another object of the present specification is to provide a method for a portable device to detect a folded state based on a folded state of each body.

Another object of the present specification is to provide a method for a portable device to detect occurrence of an event related to an application and display visual information based on the detected event.

Another object of the present specification is to provide a method for a portable device to detect a change of a folded state of a body based on a folding angle of each body.

Another object of the present specification is to provide a method for a portable device to control an area in which visual information is displayed based on a folded state of each body.

Another object of the present specification is to provide a method for a portable device to display visual information in a partial area only of a display area.

Another object of the present specification is to provide a method for a portable device to configure an area in which visual information is displayed based on whether or not a folding angle is changed within threshold time.

Another object of the present specification is to provide a method for a portable device to detect a control input and configure an area in which visual information is displayed based on the detected control input.

The other object of the present invention is to provide a method for a portable device to detect occurrence of an event based on a triggering signal received from an external device.

Technical Solution

To achieve these and other advantages and in accordance with the purpose of the present invention, as embodied and broadly described, according to one embodiment, a portable device including a first body positioned at the center, a second body positioned at one side of the first body, and a third body positioned at another side of the first body includes a display unit configured to display visual information in a first display area positioned at the front side of the first body, a second display area positioned at the front side of the second body, and a third display area positioned at the front side of the third body, a folding sensor unit configured to detect whether or not the second body is folded on the basis of a first folding axis positioned between the first body and the second body and detect whether or not the third body is folded on the basis of a second folding axis positioned between the first body and the third body, and a processor configured to control the display unit and the folding sensor unit. In this case, if the second body and the first body are folded on the basis of the first folding axis, the third body and the first body are folded on the basis of the second folding axis, and the second display area is positioned at the front direction of the portable device, the processor can detect a first folded state. The processor can detect occurrence of an event related to a second application different from a first application in a state that first visual information related to the first application, which is displayed in the second display area, is displayed in the first folded state. If a change of a first folding angle between the first body and the third body on the basis of the second folding axis is detected, the processor can display second visual information related to the detected event in a partial area of the third display area while continuously displaying the first visual information in the second display area.

To further achieve these and other advantages and in accordance with the purpose of the present invention, according to a different embodiment, a method of controlling a portable device including a first body positioned at the center, a second body positioned at one side of the first body, and a third body positioned at another side of the first body, includes the steps of, if the second body and the first body are folded on the basis of a first folding axis, the third body and the first body are folded on the basis of a second folding axis, and a second display area is positioned at the front direction of the portable device, detecting a first folded state, displaying first visual information related to a first application in the second display area in the first folded state, detecting occurrence of an event related to a second application different from the first application in a state that the first visual information is displayed, and if a change of a first folding angle between the first body and the third body on the basis of the second folding axis is detected, displaying second visual information on the event in a partial area of a third display area while continuously displaying the first visual information in the second display area.

Advantageous Effects

According to the present specification, it is able to provide a portable device and a method of controlling therefor.

According to the present specification, a portable device may have a structure including a first body located at the center, a second body located at one side of the first body, and a third body located at another side of the first body.

According to the present specification, a portable device can detect a folded state based on a folded state of each body.

According to the present specification, a portable device can detect occurrence of an event related to an application and display visual information based on the detected event.

According to the present specification, a portable device can detect a change of a folded state of a body based on a folding angle of each body.

According to the present specification, a portable device can control an area in which visual information is displayed based on a folded state of each body.

According to the present specification, a portable device can display visual information in a partial area only of a display area.

According to the present specification, a portable device can configure an area in which visual information is displayed based on whether or not a folding angle is changed within threshold time.

According to the present specification, a portable device can detect a control input and configure an area in which visual information is displayed based on the detected control input.

According to the present specification, a portable device can detect occurrence of an event based on a triggering signal received from an external device.

DESCRIPTION OF DRAWINGS

FIG. 4 is a front view and a side view of a portable device according to one embodiment of the present specification;

FIGS. 5*a* and 5*b* are diagrams of a method for a portable device to display visual information based on a folding angle according to one embodiment of the present specification;

FIGS. 6*a* and 6*b* are diagrams of a method for a portable device to display visual information based on a threshold time according to one embodiment of the present specification;

FIG. 7 is a diagram of a method for a portable device to configure an area in which visual information is displayed based on a folding angle according to one embodiment of the present specification;

FIG. 8 is a diagram of a method for a portable device to detect an event and display visual information when the portable device is unfolded according to one embodiment of the present specification;

FIGS. 9*a* and 9*b* are diagrams of a method for a portable device to display alarm information on an event according to one embodiment of the present specification;

FIG. 10 is a diagram of a method for a portable device to display visual information based on a control input according to one embodiment of the present specification;

FIG. 11 is flowchart for a method of controlling a portable device according to one embodiment of the present specification.

BEST MODE

Hereinafter, preferred exemplary embodiments of the present specification that can best carry out the above-described objects of the preset specification will be described in detail with reference to the accompanying drawings. It will be apparent that the technical scope and spirit of the present specification will not be limited only to the exemplary embodiments set forth herein.

In addition, although the terms used in the present specification are selected from generally known and used terms, the terms used herein may be varied or modified in accordance with the intentions or practice of anyone skilled in the art, or along with the advent of a new technology. Alternatively, in some particular cases, some of the terms mentioned in the present specification may be selected by the applicant at his or her discretion, the detailed meanings of which are described in relevant parts of the description herein. Furthermore, it is required that the present specification is understood, not simply by the actual terms used but by the meaning of each term lying within.

Additionally, in the present specification, although terms such as first and/or second may be used to describe diverse elements of the present specification, it should be understood that the elements included in the present specification will not be limited only to the terms used herein. The above-mentioned terms will only be used for the purpose of differentiating one element from another element, for example, without deviating from the scope of the present specification, a first element may be referred to as a second element, and, similarly, a second element may also be referred to as a first element.

Moreover, throughout the entire description of the present specification, when one part is said to "include (or comprise)" an element, unless specifically mentioned otherwise, instead of excluding any other element, this may signify that the one part may further include other elements. Furthermore, the term "unit (or part)", which is mentioned in the present specification, refers to a unit for processing at least one function or operation, and this may be realized in the form of hardware, software, or in a combination of both hardware and software.

Figure 1:
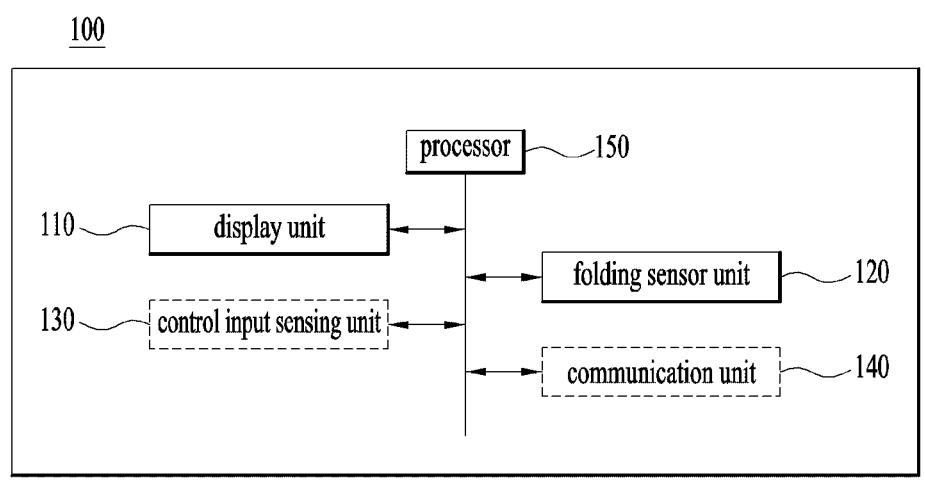
FIG. 1 is a block diagram for a portable device according to one embodiment of the present specification.

FIG. 1 is a block diagram for a portable device according to one embodiment of the present specification.

A portable device 100 may correspond to a device including a first body, a second body, and a third body. More specifically, the portable device may correspond to a device including a first body located at the center, a second body located at one side of the first body, and a third body located at another side of the first body. In this case, as an example, the portable device can include the first body located at the center, the second body located at the right side of the first body, and the third body located at the left side of the first body. The second body and the third body can be folded into the first body. In this case, the second body can be folded into the first body on the basis of a first folding axis between the first body and the second body. The third body can be folded into the first body on the basis of a second folding axis between the first body and the third body. In particular, the portable device 100 may have a device structure including three foldable bodies. And, for example, the portable device may correspond to a flexible device. As an example, the first body, the second body, and the third body can be implemented by a single integrated structure. In this case, the portable device can determine the first body, the second body, and the third body based on whether or not the portable device of the flexible structure is folded. More specifically, since a flexible device is made of a bendable material, the device can be folded. In this case, as an example, a first folding axis and a second folding axis can be configured based on lines at which the flexible device is folded. In this case, the flexible device can be divided into a first body, a second body, and a third body on the basis of the first folding axis and the second folding axis. In particular, the portable device 100 may have a structure capable of being divided into three areas based on two folding lines, by which the present specification may be non-limited.

The portable device 100 can include a display unit 110, a folding sensor unit 120, and a processor 150. And, the portable device 100 can further include a control input sensing unit 130 as an optional configuration. And, the portable device 100 can further include a communication unit 140 as an optional configuration. In this case, as an example, each of the units may corresponds to a configuration element or a part constructing the portable device 100. In particular, each of the units may corresponds to an independent unit embedded in the portable device 100 to execute a function of the portable device 100, by which the present specification may be non-limited.

The display unit 110 can be controlled by the processor 150. In this case, the display until 10 can display an image in at least one area selected from the group consisting of a first display area of the first body, a second display area of the second body, and a third display area of the third body. In this case, as an example, the first body includes a first display unit and may be able to display an image in the first display area using the first display unit. And, the second body includes a second display unit and may be able to display an image in the second display area using the second display unit. And, the third body includes a third display unit and may be able to display an image in the third display area using the third display unit. In particular, the display unit is separately included in each body to display an image in an area included in each body. And, as an example, the display unit 110 may correspond to a single integrated unit and may be able to display an image in each of the first display area, the second display area, and the third display area, respectively. As an example, if the portable device 100 corresponds to a flexible display device, the display unit 110 may have an integrated structure. In this case, a first folding axis and a second folding axis can be configured in the portable device based on folding. In this case, the display unit 110 can display an image in a first display area, a second display area, and a third display area, respectively, based on the first folding axis and the second folding axis. In particular, the display unit 110 may correspond to a unit capable of respectively displaying an image in the first display area of the first body, the second display area of the second body, and the third display area of the third body, by which the present specification may be non-limited.

And, as an example, the display unit 110 can display an image in a front side area and a rear side area of the first body, the second body, and the third body. More specifically, the first display area can be set to either the front side or the rear side of the first body. And, the first display area can be set to both the front side and the rear side of the first body. In particular, the portable device 100 can display an image in at least one of the front side and the rear side of each body, by which the present specification may be non-limited.

The portable device 100 can include a folding sensor unit 120. In this case, the folding sensor unit 120 can detect that the second body is folded into the first body. And, the folding sensor unit 120 can detect that the third body is folded into the first body. More specifically, the second body can be folded into the first body on the basis of a first folding axis. In this case, the first folding axis can be positioned between the first body and the second body. And, the third body can be folded into the first body on the basis of a second folding axis. In this case, the second folding axis can be positioned between the first body and the third body.

The folding sensor unit 120 detects that at least one of the second body and the third body is folded and can forward detected information to the processor 150. By doing so, the processor 150 can detect a folded state of the portable device 100. As an example, the folding sensor unit 120 can further detect a first folding angle between the first body and the second body on the basis of the first folding axis. And, the folding sensor unit 120 can further detect a second folding angle between the first body and the third body on the basis of the second folding axis. In this case, the first folding angle and the second folding angle may have a greatest angle in a state that the portable device is unfolded. In this case, the unfolded state may correspond to a state that all of the first body, the second body, and the third body form the same plane.

The folding sensor unit 120 can detect that the first folding angle and the second folding angle are changing. In particular, the folding sensor unit 120 can detect whether or not a body is folded by detecting a change of an internal angle of the body. As a different example, the folding sensor unit 120 can detect a degree of folding based on a distance between the first body and the second body. More specifically, the folding sensor unit 120 can detect a first distance between the first body and the second body and a second distance between the first body and the third body. In this case, the folding sensor unit 120 can detect whether or not each of the bodies is folded based on the first distance and the second distance. In particular, the folding sensor unit 120 can detect whether or not each of the bodies is folded on the basis of the first folding axis and the second folding axis, by which the present specification may be non-limited.

The portable device 100 can further include a control input sensing unit 130 as an optional configuration. In this case, the control input sensing unit 130 can forward a user input or environment recognized by the device to the processor 150 using at least one or more sensors installed in the portable device 100. More specifically, the control input sensing unit 130 can sense a control input of a user using at least one or more sensors installed in the portable device 100. In this case, the at least one or more sensing means can include various sensing means for sensing a control input including a touch sensor, a fingerprint sensor, a motion sensor, a proximity sensor, an illumination sensor, a voice recognition sensor, a pressure sensor, and the like. The control input sensing unit 120 is a common name of the aforementioned various sensing means. The aforementioned sensors can be included in the device as a separate element or can be included in the device in a manner of being integrated as at least one or more elements. In particular, the control input sensing unit 120 may correspond to a unit for sensing a control input of a user, by which the present specification may be non-limited. And, as an example, a control input may corresponds to a gesture input and include various contact or noncontact inputs. And, the control input may correspond to an input inputted by an input device or an input inputted by voice or audio, by which the present specification may be non-limited. And, as an example, the control input sensing unit 130 may correspond to an element integrated with the display unit 110. As an example, the display unit 110 may correspond to a touch sensitive display unit 110.

The portable device 100 can include a communication unit 140 as an optional configuration. In this case, the communication unit 140 performs communication with an external device using various protocols to transmit and receive data with the external device. And, the communication unit 140 accesses a network in wired/wireless to transmit and receive digital data such as contents and the like with the network. More specifically, the communication unit 140 can receive a triggering signal from an external device. In this case, the triggering signal may correspond to a signal for an application executed in the portable device 100. The portable device 100 can detect an event for the application based on the triggering signal. Regarding this, it shall be described in FIG. 3. In this case, the external device may correspond to a portable device or a device capable of sharing information using communication. In particular, the portable device 100 can perform communication with the external device using various protocols.

The processor 150 may correspond to a unit for controlling at least one selected from the group consisting of the display unit 110, the folding sensor unit 120, the control input sensing unit 130, and the communication unit 140. More specifically, the processor 150 can receive folding information on whether or not the second body is folded into the first body on the basis of the first folding axis from the folding sensor unit 120. And, the processor 150 can receive folding information on whether or not the third body is folded into the first body on the basis of the second folding axis from the folding sensor unit 120. In this case, the processor 150 can configure a folded state based on the folding information. More specifically, if the second body overlays the first body in a manner of being folded to the first body on the basis of the first folding axis, the third body overlays the first body in a manner of being folded to the first body on the basis of the second folding axis, and a second display area of the second body is located at the front direction of the portable device 100, the portable device 100 can detect a first folded state. In particular, the first folded state may correspond to a state that each of the bodies of the portable device 100 is folded and the second display area is located at the front direction. And, if the second body is unfolded to make a flat with the first body and the third body is unfolded to make a flat with the first body, the processor can detect a second folded state. In particular, if each of the bodies of the portable device 100 is unfolded to make a flat, the processor 150 can detect it as the second folded state.

And, the processor 150 can display visual information in at least one area selected from the group consisting of a first display area of the front side of the first body, a second display area of the front side of the second body, and a third display area of the front side of the third body. And, the processor 150 can detect a control input inputted on at least one area selected from the group consisting of the first display area, the second display area, and the third display area. And, the processor 150 can share information with an external device via the communication unit 140.

And, the processor 150 can execute a first application in the first folded state. In this case, the processor 150 can display first visual information related to the first application in the second display area. In particular, the processor 150 can display the first visual information in the front side area in the first folded state. In this case, the first application can be executed by the portable device 100. As an example, the first application may correspond to an image, a video, a game, SNS, or the like. And, the first visual information may correspond to content information provided by the first application in progress. In particular, the first application can display contents in a manner of being executed by the portable device 100, by which the present specification may be non-limited. In this case, the processor 150 can detect occurrence of an event related to a second application in a state that the first visual information is displayed. In this case, as an example, the event can be detected based on a triggering signal received from an external device. If a triggering signal related to the second application is received from the external device, the processor 150 can detect an event. In this case, as an example, the event can include at least one selected from the group consisting of a voice event, a text message event, a vibration event, and an image vent. In particular, the event may correspond to alarm information detected by the portable device 100, by which the present specification may be non-limited. Subsequently, the processor 150 can detect that a first folding angle between the first body and the third body is changing on the basis of the second folding axis using the folding sensor unit 120. In this case, as an example, if the first folding angle is equal to or greater than a first threshold angle and less than a second threshold angle, the processor 150 can detect it as the first folding angle is changing. In this case, the first threshold angle and the second threshold angle may correspond to a threshold angle for detecting whether or not the first folding angle is changed. In particular, the processor 150 can determine whether or not the first folding angle is changed on the basis of the threshold angle. In this case, the processor 150 can display second visual information on an event in the third display area while consistently displaying the first visual information in the second display area. More specifically, if occurrence of an event for a second application is detected and the first folding angle is changed on the basis of the second folding axis, the processor 150 can display the second visual information on the event. In this case, as an example, the second application may correspond to an application different from the first application. In particular, the portable device 100 can detect occurrence of an event for a different application rather than the first application in progress. In this case, the processor 150 can maintain the display of the first visual information. The processor 150 can display the second visual information on the event in the third display area which is exposed according to the change of the first folding angle. By doing so, a user can check information on the event related to the second application while continuously watching the first visual information related to the first application. And, for example, the processor 150 can activate a partial area only of the third display area according to the change of the first folding angle. Regarding this, it shall be described later with reference to FIGS. 4a and 4b.

The aforementioned elements can be included in the portable device 100 as a separate element or can be included in the portable device in a manner of being integrated by at least one or more elements.

Figure 2:
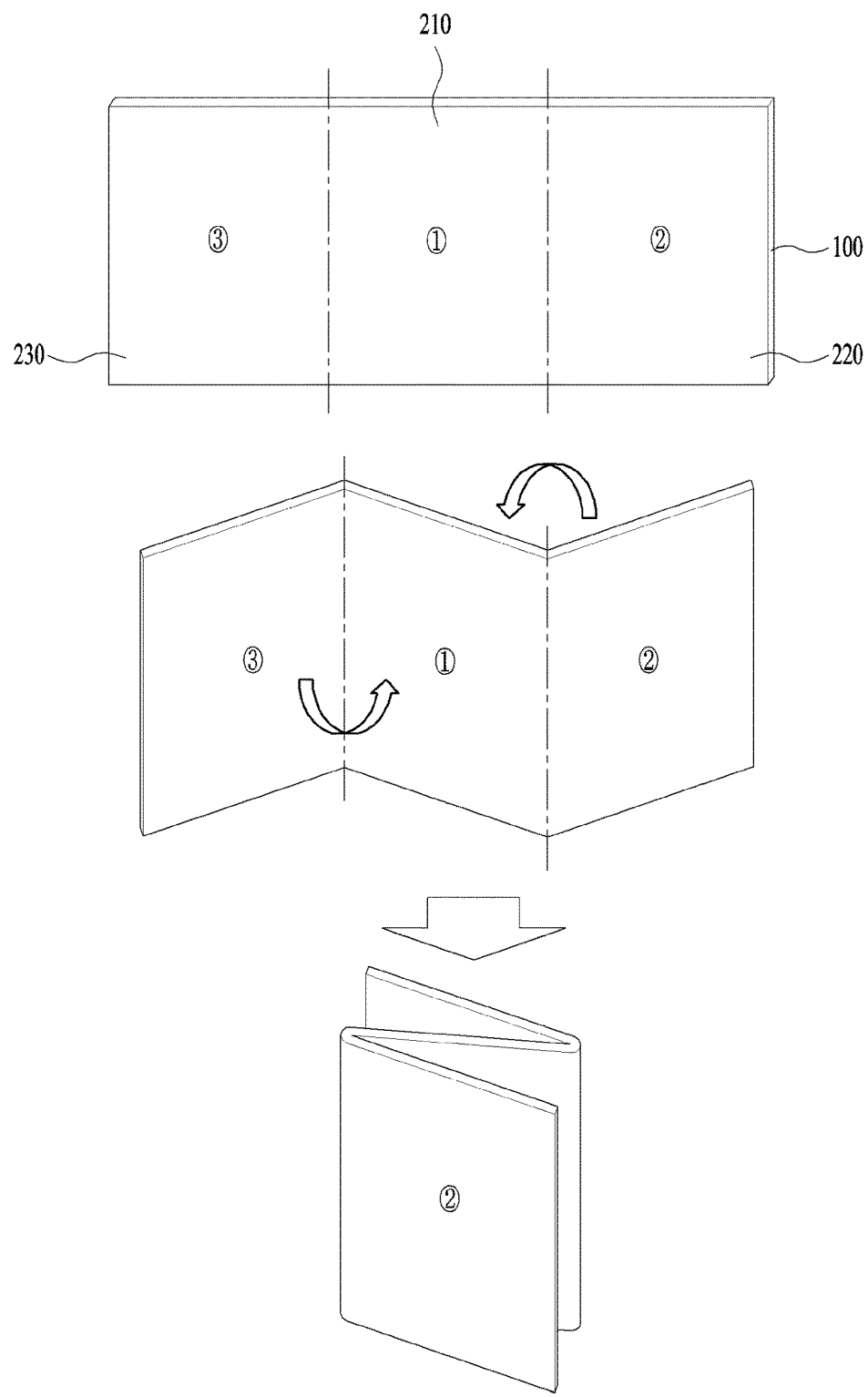
FIG. 2 is a diagram for a method of folding a portable device according to one embodiment of the present specification.

FIG. 2 is a diagram for a method of folding a portable device according to one embodiment of the present specification. As mentioned in the foregoing description, the portable device 100 can include the first body 210, the second body 220, and the third body 230. In this case, the second body 220 can be positioned at the right side of the first body 210. And, the third body 230 can be positioned at the left side of the first body 210.

The portable device 100 can make a first display area, a second display area, and the third display area to be positioned at the front direction of each of the bodies, respectively. In particular, the front direction may correspond to a direction in which an image is displayed in the portable device 100. And, the rear direction may correspond to a direction in which an image is not displayed in the portable device 100. In particular, when a user holds the portable device 100, the front direction corresponds to a direction facing the user and the rear direction corresponds to a direction opposite to the direction facing the user. In this case, as an example, the second body 220 can be folded into the first body 210 to make the rear side of the second body 220 and the rear side of the first body 210 to be overlapped with each other. And, the third body 230 can be folded into the first body 210 to make the front side of the third body 230 and the front side of the first body 210 to be overlapped with each other. In particular, the second body 220 and the third body 230 can be folded into the first body in a manner that the second body and the third body are contacted with a different side of the first body 210, respectively. In this case, if the rear side of the second body 220 and the rear side of the first body 210 are folded and the front side of the second body 220 corresponds to the front direction of the portable device, the foldable device 100 can detect a first folded state. In particular, if the second body 220 and the third body 230 are folded and the second display area corresponds to the front direction, the portable device 100 can detect the first folded state.

As a different example, the second body 220 can be folded into the first body 210 to make the front side of the second body 220 and the front side of the first body 210 to be overlapped with each other. And, the third body 230 can be folded into the first body 210 to make the rear side of the third body 230 and the rear side of the first body 210 to be overlapped with each other. In particular, the second body 220 and the third body 230 can be folded into the first body in a manner that the second body and the third body are contacted with a different side of the first body 210, respectively. In this case, if the third display area of the third body is identical to the front direction of the portable device 100, the processor 150 can detect the first folded state.

In particular, if each of the bodies is folded and a display area is positioned at the front direction, the portable device 100 can detect the first folded state, by which the present specification may be non-limited.

Figure 3:
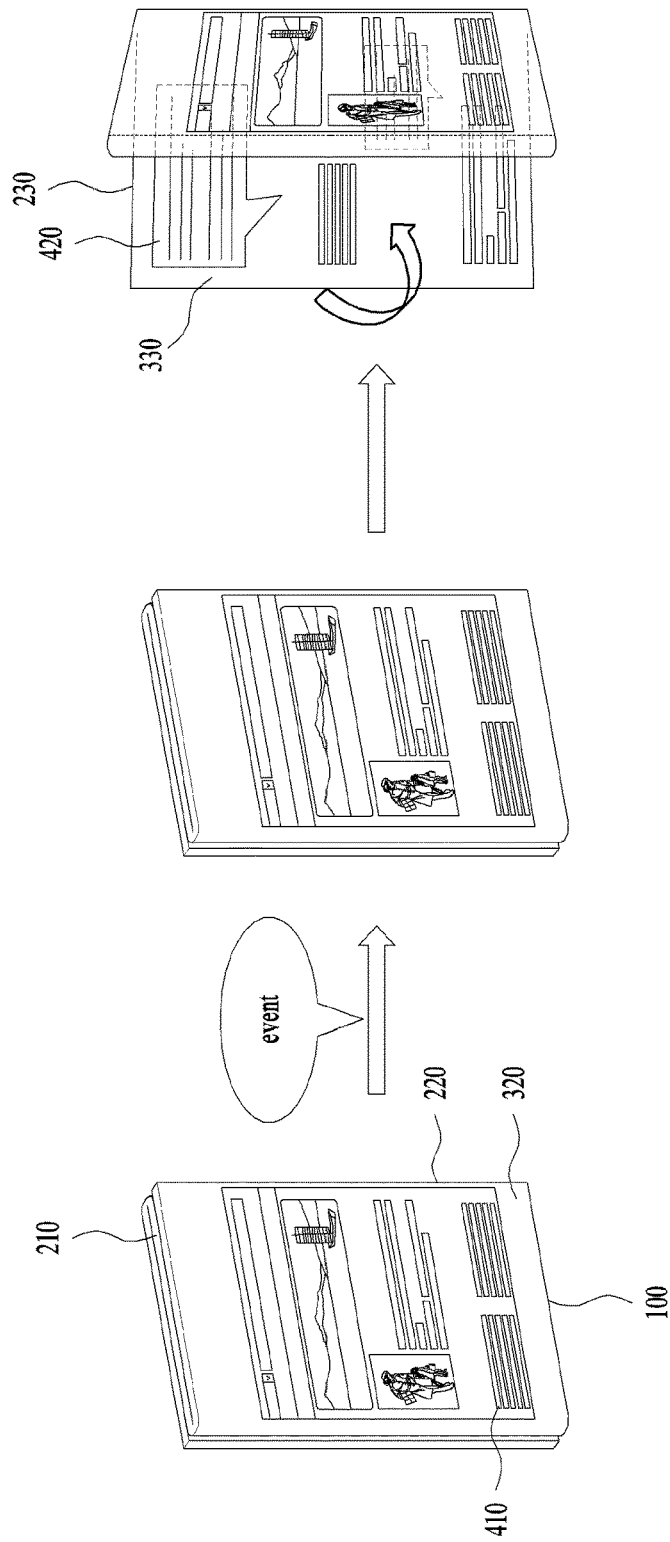
FIG. 3 is a diagram of a method for a portable device to display visual information based on an event according to one embodiment of the present specification.

FIG. 3 is a diagram of a method for a portable device to display visual information based on an event according to one embodiment of the present specification. The portable device 100 can display first visual information 410 related to a first application in a second display area 220 in a first folded state. In this case, as mentioned in the foregoing description, the first folded state may correspond to a state that the second body 220 is folded into the first body 210 on the basis of the first folding axis, the third body 230 is folded into the first body 210 on the basis of the second folding axis, and the second display area 320 is positioned at the front direction of the portable device 100. In this case, the portable device 100 can display the first visual information 410 related to the first application in the second display area 320 of the second body 220. In this case, as mentioned in the foregoing description, the first application corresponds to an application executed in the portable device 100 and the first visual information may correspond to contents provided by the first application. In particular, the portable device 100 can display the first visual information 410 in the front side area in the first folded state. In this case, the portable device 100 can detect an event for a second application. In this case, the second application may correspond to an application different from the first application. And, as an example, the event may correspond to information based on information received from an external device via the communication unit 140. As an example, the second application may correspond to a messenger application and the event may correspond to a message signal received from an external device. As a different example, the event can be detected based on a signal generated by the portable device. For example, the second application may correspond to an alarm application and the event can be detected based on alarm time. In particular, the event may correspond to information on the second application, by which the present specification may be non-limited.

Having detected the event, the portable device 100 can detect that a first folding angle between the first body 210 and the third body is changing on the basis of the second folding axis. In this case, as mentioned in the foregoing description, the portable device 100 can detect the change of the first folding angle using the folding sensor unit 120. If the first folding angle is equal to or greater than a first threshold angle and less than a second threshold angle, the portable device 100 can detect that the first folding angle has changed. In this case, as mentioned in the foregoing description, the first threshold angle and the second threshold angle may correspond to a threshold angle for determining whether or not the first folding angle is changed and the threshold angle can be changed/configured by a user or the processor 150.

Having detected the event and the change of the first folding angle, the portable device 100 can display second visual information 420 on the event in the third display area 330 of the third body 230 while continuously displaying the first visual information 410 in the second display area 320. More specifically, if the first folding angle is changed, a part of the third display area 330 can be exposed. In this case, the portable device 100 can display the second visual information 420 on the event in the exposed third display area 330 while continuously displaying the first visual information 410 in the second display area 320 corresponding to a consistently exposed area. In this case, as an example, the second visual information 420 may correspond to information on contents provided by the second application based on the event. For example, if the second application corresponds to a messenger application and the event corresponds to a message, the second visual information 420 may correspond to information on contents of the message.

If the first folding angle is changed, the portable device 100 can display the second visual information 420 related to the second application in the third display area 330. As a different example, if the first folding angle is changed, the portable device 100 can display third visual information in the third display area 330. In this case, the third visual information may correspond to detail information on the second application. In particular, having detected the event and the change of the first folding angle, the portable device 100 can display the second visual information 420 related to the event or information more detail than the second visual information 420, by which the present specification may be non-limited.

As a further different example, the portable device 100 can detect the change of the first folding angle in a state that an event is not detected. In this case, the portable device 100 can display fourth visual information (not depicted) in the third display area 330. In this case, as an example, the fourth visual information may correspond to information on the first application 410. For example, the fourth visual information may correspond to attribute information, detail information, etc. on the first application 410. In particular, the fourth visual information may correspond to information related to the first application 410. If the first folding angle is changed in a state that an event is not detected, the portable device 100 can display detail information on the first application.

FIG. 4 is a front view and a side view of a portable device according to one embodiment of the present specification. As mentioned in the foregoing description, the portable device 100 detects an event in the first folded state and can detect a change of the first folding angle between the first body 210 and the third body 330 on the basis of the second folding axis. In this case, referring to FIG. 4, the portable device 100 displays first visual information 410 related to a first application in the second display area 320 and can display second visual information 420 on an event related to a second application in the third display area 330. In this case, the second display area 320 and the third display area 330 can be positioned at the front side of the portable device 100. In this case, as an example, among the display areas, the second display area 320 and the exposed third display area 330 are activated only to display visual information. In particular, the portable device 100 can further display visual information on an event in the exposed third display area 330, by which the present specification may be non-limited. In this case, if we look at the portable device 100 at the side, the first folding angle between the first body 210 and the third body 230 is in a state of being changed on the basis of the first folding axis. In this case, as an example, the portable device 100 can display the second visual information 420 in the third display area irrespective of the second folding angle between the first body 210 and the second body 220. In particular, the portable device 100 can display the second visual information 420 based on the first folding angle only.

Figure 5B:
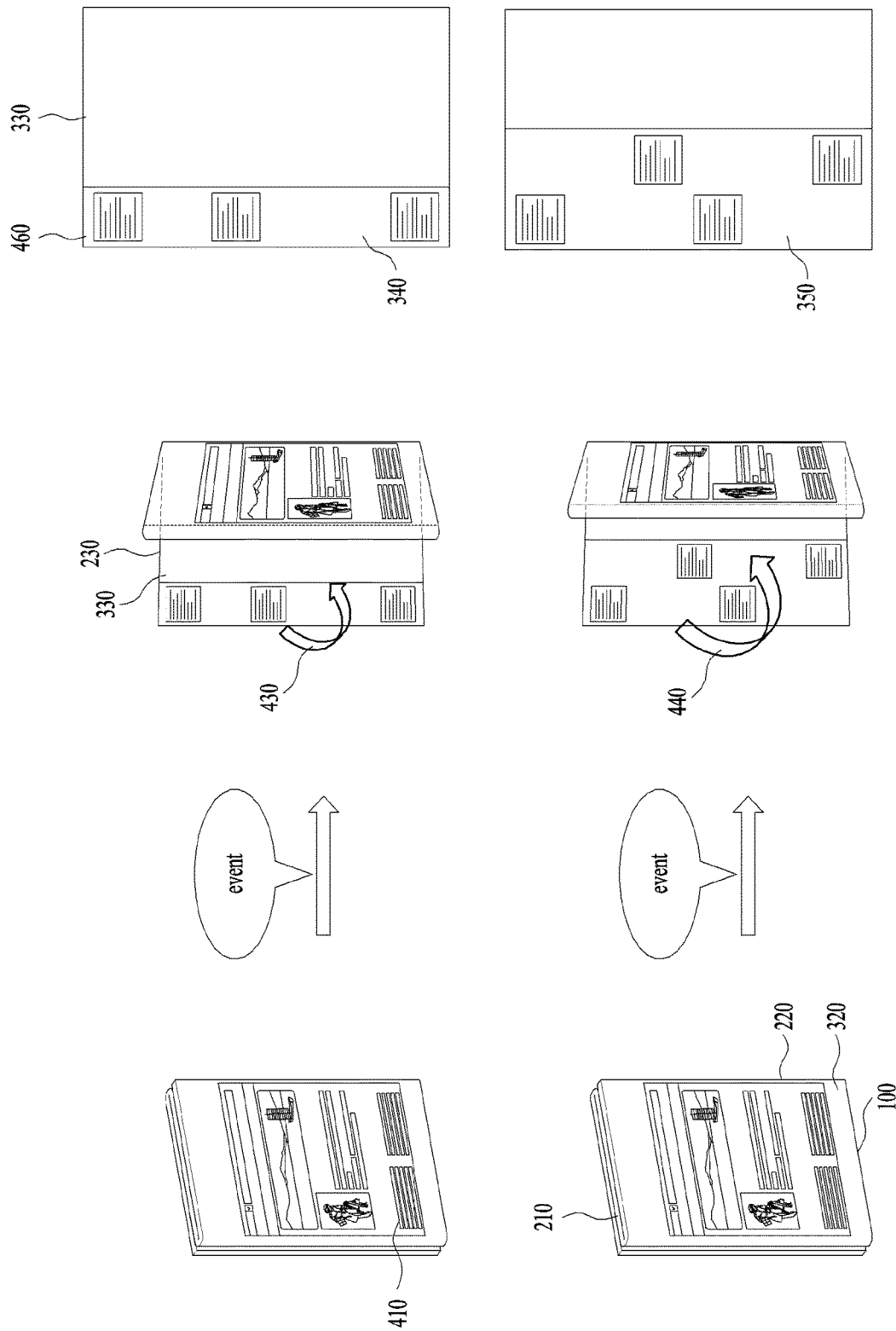

FIGS. 5*a* and 5*b* are diagrams of a method for a portable device to display visual information based on a folding angle according to one embodiment of the present specification. The portable device 100 can display the first visual information 410 related to the first application in the second display area 320 in the first folded sate. In this case, if the portable device 100 detects an event for the second application and a change of the folding angle between the first body 210 and the third body 230, the portable device 100 can display the second visual information in the third display area 330 while continuously displaying the first visual information in the second display area 320. In this case, the portable device 100 can configure a partial area of the third display area 330 as an event area 340.

As an example, if the third body 230 is folded into the first body 210, the third display area 330 can be deactivated. In this case, if the folding angle between the first body 210 and the third body 230 is changed, the portable device 100 can activate a partial area of the third display area 330 based on the folding angle. In this case, the portable device 100 can configure the activated area as an event area 340. The portable device 100 can display the second visual information 420 in the event area 340.

As a different example, the event area 340 can be displayed at the edge of the third display area 330. More specifically, in the first folded state, the front side of the third body 230 is folded with the front side of the first body 230 in a manner of being overlaid. Hence, the third display area 330 positioned at the front side of the third body 230 may not be exposed in the first folded state. In this case, if the folding angle between the first body 210 and the third body 230 is changed, the third display area 330 can be exposed. And, if the folding angle between the first body 210 and the third body 230 increases, an exposed area of the third display area 330 may increase. In this case, the portable device 100 can configure the exposed area of the third display area 330 as an event area. In this case, the portable device 100 can display the second visual information in the event area.

In this case, as an example, the portable device 100 can detect that the folding angle between the first body 210 and the third body 230 is changed to a first folding angle 430. In this case, the portable device 100 can configure a partial area of the third display area 330 as a first event area 340. And, the portable device 100 can detect that the folding angle between the first body 210 and the third body 230 is changed to a second folding angle 440. In this case, the portable device 100 can configure a partial area of the third display area 330 as a second event area 350. In this case, if the second folding angle 440 is greater than the first folding angle 430, the portable device 100 can configure the second event area 350 to be greater than the first event area 340. In particular, if the folding angle between the first body 210 and the third body 230 increases, the portable device 100 can increase a size of the event area. In this case, if the size of the event area increases, the portable device 100 can display the second visual information by magnifying the second visual information.

In this case, as an example, referring to FIG. 5*a*, the first application may correspond to an internet application. In this case, the portable device 100 can detect an event for the second application. In this case, as an example, the second application may correspond to a menu application and the event may correspond to alarm information displaying a menu. In this case, the portable device 100 can display menu information 450 as the second visual information. If the folding angle between the first body 210 and the third body 230 increases, the menu information 450 can be displayed in a manner of being magnified.

As a different example, referring to FIG. 5*b*, the first application 410 may correspond to an internet application. In this case, the portable device 100 can detect an event for the second application. In this case, as an example, the second application may correspond to a messenger application and the event may correspond to an event based on a message received from an external device. In this case, the portable device 100 can display message information 460 as the second visual information. If the folding angle between the first body 210 and the third body 230 increases, the message information can be displayed in a manner of being magnified. In this case, as a further different example, if the folding angle between the first body 210 and the third body 230 increases, the portable device 100 can further display message information 460 which was not exposed before. More specifically, the portable device 100 can display messages written by a first user only when the folding angle between the first body 210 and the third body 230 corresponds to the first folding angle 430. In this case, if the folding angle increases and the first folding angle 430 becomes the second folding angle 440, the portable device 100 can display not only the messages written by the first user but also messages written by a second user. In particular, if the folding angle between the first body 210 and the third body 230 increases, the portable device 100 can further display unexposed visual information among the visual information provided by the second application, by which the present specification may be non-limited.

FIGS. 6*a* and 6*b* are diagrams of a method for a portable device to display visual information based on a threshold time according to one embodiment of the present specification. If the portable device 100 detects an event and a change of the folding angle between the first body 210 and the third body 230, the portable device 100 can display second visual information 610 for the event in the third display area 330 while continuously displaying first visual information 410 related to the first application in the second display area 320.

In this case, as an example, referring to FIG. 6*a*, after the event is detected, the portable device 100 can detect that the folding angle between the first body 210 and the third body 230 is changed within a threshold time. In this case, the portable device 100 can display the second visual information 610 for the event in the third display area 330. In this case, the second visual information may correspond to visual information on the second application. And, the threshold time may correspond to a threshold time for determining whether to display the visual information on the second application and may have a prescribed error.

And, referring to FIG. 6*b*, when the threshold time elapses after the event is detected, the portable device 100 can detect that the folding angle between the first body 210 and the third body 230 is changed. In this case, the portable device 100 can display third visual information 620 in the third display area 330. In this case, as an example, the third visual information 620 may correspond to information on the first application 410. As an example, the third visual information 620 may correspond to detail information and attribute information on the first application 410. In particular, if the event is detected and the change of the folding angle between the first body 210 and the third body 230 is detected after the threshold time elapses, the portable device 100 can display the third visual information 620 in the third display area 330 irrespective of the event. And, as an example, if the change of the folding angle between the first body 210 and the third body 230 is detected in a state that the event is not detected, the portable device 100 can display the third visual information 620 in the third display area 330.

FIG. 7 is a diagram of a method for a portable device to configure an area in which visual information is displayed based on a folding angle according to one embodiment of the present specification. The portable device 100 can display first visual information 410 in the second display area 320 in the first folded state. In this case, the portable device 100 can detect an event for the second application. Subsequently, if the portable device 100 detects the change of the first folding angle between the first body 210 and the third body 230, the portable device 100 can display second visual information on the event in the third display area 330. In this case, as an example, if the first folding angle is equal to or greater than a first threshold angle and less than a second threshold angle, the portable device 100 can detect that the first folding angle has changed. In this case, the portable device 100 can detect that the first folding angle changes to an angle equal to or greater than the second threshold angle. In this case, the portable device 100 can display the second visual information 710 in the first display area 310 in a manner of expanding the visual information from the third display area 330. In particular, the second threshold angle may correspond to a threshold angle for determining whether or not the first display area 310 is exposed.

As an example, referring to FIG. 7, if the first folding angle corresponds to a first angle 620, the portable device 100 can display the second visual information 710 in the third display area 330. In this case, the first angle 620 may have a range equal to or greater than the first threshold angle and less than the second threshold angle. And, if the first folding angle corresponds to a second angle 630, the portable device 100 can display the second visual information 710 in the third display area 330 and the first display area 310. In this case, the second angle 630 may have a range equal to or greater than the second threshold angle.

FIG. 8 is a diagram of a method for a portable device to detect an event and display visual information when the portable device is unfolded according to one embodiment of the present specification. The portable device 100 can detect that a first folded state is switched to a second folded state when the second visual information 420 is displayed in the third display area 330. In this case, the second folded state corresponds to a flat state that the first body 210 and the second body 220 are positioned at the same plane and the first body 210 and the third body 230 are positioned at the same plane. In particular, the second folded state may correspond to a state that the portable device 100 is unfolded. In this case, the portable device 100 can display the third visual information 430 in the first display area 310 and the third display area 330 while continuously displaying the first application 410 in the second display area 320. More specifically, if the first folding angle between the first body 210 and the third body 230 is changed in the first folded state, the portable device 100 can display the second visual information 420 in the third display area 330. In particular, if the first folding angle is changed only, the portable device 100 can display the second visual information 420 corresponding to partial information on the second application 430. In this case, if the portable device 100 is completely unfolded to switch to the second unfolded state, the portable device 100 can display the third visual information 430 corresponding to the entire information on the second application 430. By doing so, a user may be able to watch brief information on an event by slightly changing the first folding angle. And, the user may be able to watch the entire information on the second application 430 by unfolding the portable device 100.

FIGS. 9*a* and 10*b* are diagrams of a method for a portable device to display alarm information on an event according to one embodiment of the present specification. The portable device 100 can display the first visual information 410 in the second display area 320 in the first folded state. In this case, if the portable device 100 detects an event for the second application, the portable device 100 can display third visual information 910 related to the event in the second display area 320. In this case, as an example, the third visual information 910 may correspond to alarm information indicating that the event for the second application is detected. More specifically, if the event is detected, the portable device 100 can provide the alarm information to a user via the third visual information 910.

In this case, as an example, referring to FIG. 9*a*, the portable device 100 can detect a change of the first folding angle between the first body 210 and the third body 230 in a state that the portable device 100 displays the third visual information 910. In this case, the portable device 100 can display the second visual information 420 related to the event in the third display area 330. In this case, the portable device 100 can stop displaying the third visual information 910. In particular, if the second visual information 420 is displayed in the third display area 330, the portable device 100 can stop displaying the third visual information 910.

Figure 9B:
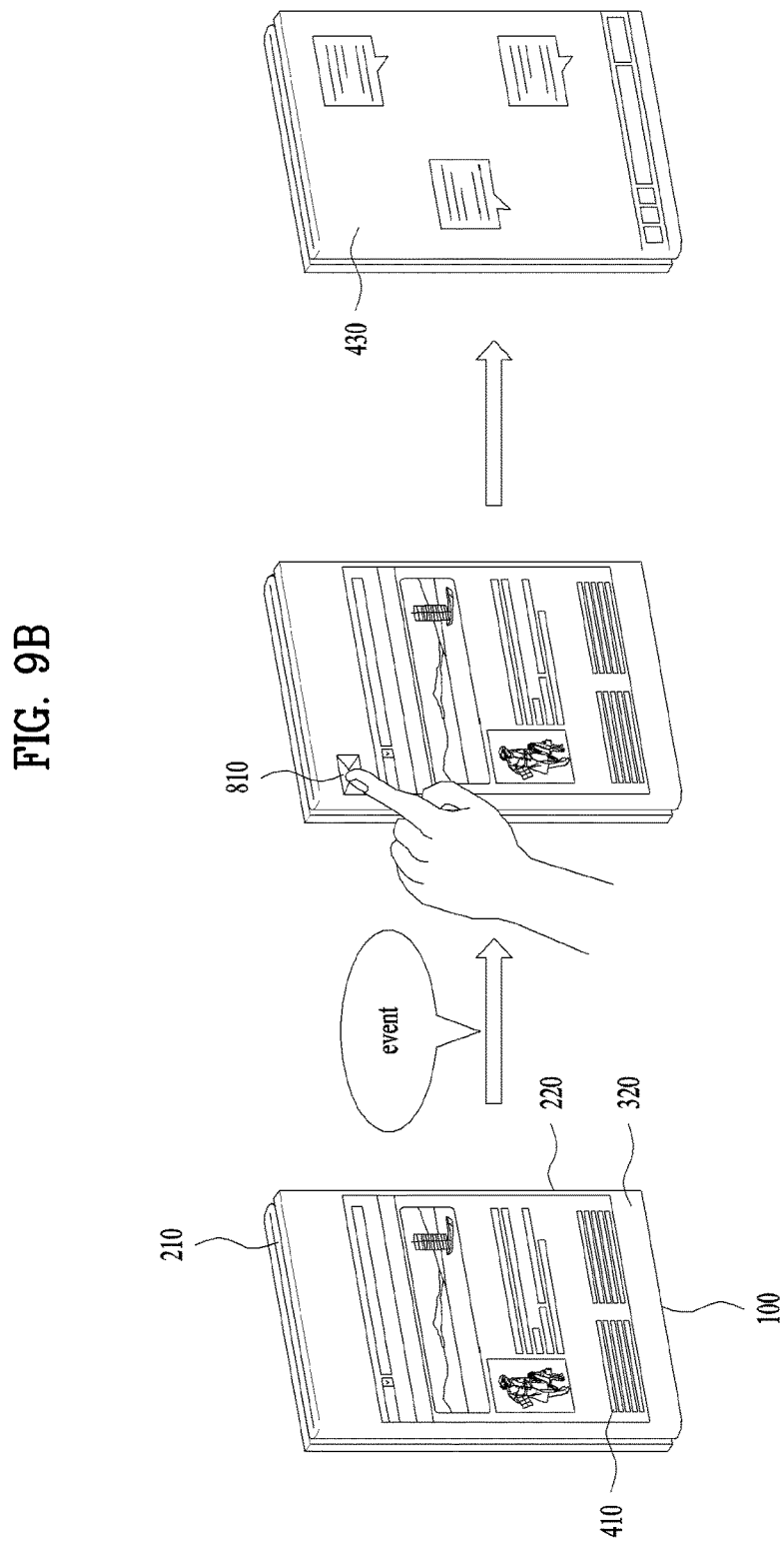

As a different example, referring to FIG. 9*b*, the portable device 100 can detect a control input selecting the third visual information 910. In this case, the portable device 100 can display the entire information on the second application in the second display area 320. More specifically, if the portable device 100 detects a control input selecting the third visual information 910, the portable device 100 can display the entire information 430 on the second application in the second display area irrespective of whether or not the first folding angle is changed.

By doing so, a user may change the first folding angle to check information on an event only. And, the user may select the third visual information 910 to display the second application itself for the event.

FIG. 10 is a diagram of a method for a portable device to display visual information based on a control input according to one embodiment of the present specification. The portable device 100 can display the first visual information 410 in the second display area 320 in the first folded state. In this case, the portable device 100 can detect an event for the second application. Subsequently, if the portable device 100 detects a change of the first folding angle between the first body 210 and the third body 230, the portable device 100 can display the second visual information 420 on the event in the third display area 330. In this case, if the portable device 100 detects a control input selecting the second visual information 420, the portable device 100 can display the entire information 430 of the second application on the second visual information 420 in the second display area 320. In this case, as an example, if the portable device 100 detects a control input selecting the second visual information 420, the portable device 100 can display the first visual information 410 in the third display area 330. In particular, the portable device 100 displays the entire information 430 of the second application in the second display area 320 and may be able to display the first visual information 410 related to the first application in the third display area 330. By doing so, a user can control an application displayed in the front side of the portable device 100.

FIG. 11 is flowchart for a method of controlling a portable device according to one embodiment of the present specification. The portable device 100 can detect a first folded state [S1110]. In this case, as mentioned earlier in FIG. 1, the portable device 100 can configure a folded state based on folding information. More specifically, if the second body overlays the first body in a manner of being folded on the basis of the first folding axis, the third body overlays the first body in a manner of being folded on the basis of the second folding axis, and the second display area of the second body is positioned at the front side of the portable device 100, the portable device 100 can detect the first folded state. In particular, the first folded state may correspond to a state that each of the bodies of the portable device 100 is folded.

Subsequently, the portable device 100 can display first visual information related to a first application in the second display area in the first folded state [S1120]. As mentioned earlier in FIG. 1, the first application can be executed by the portable device 100. As an example, the first application may correspond to an image, a video, a game, SNS, or the like. In particular, the first application can display contents in a manner of being executed by the portable device 100, by which the present specification may be non-limited.

Subsequently, the portable device 100 can detect an event related to a second application in a state that the first visual information is displayed [S1130]. In this case, as mentioned earlier in FIG. 1, as an example, the event can be detected based on a triggering signal received from an external device. In particular, if a triggering signal related to the second application is received from an external device, the portable device 100 can detect the event. In this case, as an example, the event can include at least one selected from the group consisting of a voice event, a text message event, a vibration event, and an image event. In particular, the event may correspond to alarm information detected by the portable device, by which the present specification may be non-limited. As a different example, the event may correspond to a signal generated by an application which is executed in the portable device 100, by which the present specification may be non-limited.

Subsequently, the portable device 100 can detect a change of the first folding angle [S1140]. In this case, as mentioned earlier in FIG. 3, the first folding angle between the first body 210 and the third body 330 can be changed on the basis of a second folding axis. In this case, as an example, the portable device 100 can detect the change of the first folding angle using a folding sensor unit 120. And, if the first folding angle is equal to or greater than a first threshold angle and less than a second threshold angle, the portable device 100 can detect that the first folding angle has changed. In this case, the first threshold angle and the second threshold angle may correspond to a threshold angle for determining whether or not the first folding angle is changed. The threshold angle can be changed or configured by a user or a processor 150.

Subsequently, the portable device 100 can further display second visual information on an event in a part of the third display area while continuously displaying the first visual information in the second display area [S1150]. In this case, as mentioned earlier in FIG. 3, the portable device 100 can display the second visual information 420 on the event in a part of the exposed third display area 330 in a state of maintaining the display of the first visual information 410 displayed in the second display area 320 corresponding to a consistently exposed area. In this case, as an example, the second visual information 420 may correspond to information on contents provided by the second application based on the event. As an example, if the second application corresponds to a messenger application and the event corresponds to a message, the second visual information 420 may correspond to information on message contents. As a different example, the portable device 100 can detect the change of the first folding angle in a state that an event is not detected. In this case, the portable device 100 can display third visual information (not depicted) in the third display area 330. In this case, as an example, the third visual information may correspond to information on the first application 410. For example, the third visual information may correspond to attribute information, detail information, and the like on the first application 410. In particular, the third visual information may correspond to information related to the first application 410. If the first folding angle is changed in a state that an event is not detected, the portable device 100 can display detail information on the first application.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

And, the portable device 100 and controlling method therefor may not limitedly apply to the composition and method of the aforementioned embodiments. The aforementioned embodiments can be configured in a manner of being selectively combined the whole of the embodiments or a part of the embodiments to achieve various modifications.

Meanwhile, a portable device 100 and a method of controlling therefor of the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included in the recording media. And, since the recording media readable by the processor are distributed to the computers connected by a network, codes readable by the processor can be stored and executed in a manner of being distributed.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

And, both an apparatus invention and a method invention are explained in the present specification and the explanation on the both of the inventions can be complementally applied, if necessary.

MODE FOR INVENTION

INDUSTRIAL APPLICABILITY

The present invention is usable in a user equipment and is applicable to an industry capable of being repeated.

What is claimed is:

1. A portable device containing a first body positioned at the center, a second body positioned at one side of the first body, and a third body positioned at another side of the first body, comprising:
    a display unit configured to contain a first display area positioned at the first body, a second display area positioned at the second body, and a third display area positioned at the third body;
    a folding sensor unit configured to detect whether or not the second body is folded on the basis of a first folding axis positioned between the first body and the second body and detect whether or not the third body is folded on the basis of a second folding axis positioned between the first body and the third body; and
    a processor configured to control the display unit and the folding sensor unit,
    wherein the processor is further configured to:
    when the second body and the first body are folded on the basis of the first folding axis, the third body and the first body are folded on the basis of the second folding axis, and the second display area is positioned at the front direction of the portable device, detect a first folded state,
    display first visual information related to a first application in the second display area in the first folded state,
    detect an occurrence of an event related to a second application different from the first application,
    detect whether or not a first folding angle between the first body and the second body is changed,
    display second visual information related to the detected event in at least a partial area of the third display area while continuously displaying the first visual information in the second display area,
    set the at least partial area of the third display area as an event area, the event area is configured by an edge area exposed by the first folding angle, and
    when the first folding angle increases, increase a size of the event area.

2. The portable device of claim 1, wherein when the first folding angle has a range equal to or greater than a first threshold angle and less than a second threshold angle, the processor is further configured to detect that the first folding angle is changed.

3. The portable device of claim 2, wherein when the first folding angle changed to the second threshold angle or more is detected, the processor is further configured to display the second visual information in the first display area in a manner of being expanded from the third display area.

4. The portable device of claim 1, wherein the processor is further configured to set an activated area of the third display area as the at least partial area in which the second visual information is displayed based on the changed first folding angle.

5. The portable device of claim 1, wherein the processor is further configured to display the second visual information of the second application in the event area of the third display area, and
    wherein when the size of the event area increases, the processor is further configured to increase a size of the second visual information displayed in the event area.

6. The portable device of claim 1, wherein when the portable device is switched to a second folded state from the first folded state in a state that the second visual information is displayed in the at least partial area of the third display area, the processor is further configured to continuously display the first visual information in the second display area and display third visual information related to the second application in the first display area and the third display area.

7. The portable device of claim 6, wherein the second folded state corresponds to a flat state that the first body and the second body are positioned at the same plane and the first body and the third body are positioned at the same plane.

8. The portable device of claim 1, wherein the second visual information corresponds to information on contents provided by the second application in response to the event.

9. A portable device containing a first body positioned at the center, a second body positioned at one side of the first body, and a third body positioned at another side of the first body, comprising:
    a display unit configured to contain a first display area positioned at the first body, a second display area positioned at the second body, and a third display area positioned at the third body;
    a folding sensor unit configured to detect whether or not the second body is folded on the basis of a first folding axis positioned between the first body and the second body and detect whether or not the third body is folded on the basis of a second folding axis positioned between the first body and the third body; and
    a processor configured to control the display unit and the folding sensor unit,
    wherein the processor is further configured to:
    when the second body and the first body are folded on the basis of the first folding axis, the third body and the first body are folded on the basis of the second folding axis, and the second display area is positioned at the front direction of the portable device, detect a first folded state,
    display first visual information related to a first application in the second display area in the first folded state,
    detect an occurrence of an event related to a second application different from the first application, detect whether or not a first folding angle between the first body and the second body is changed, display second visual information related to the detected event in at least a partial area of the third display area while continuously displaying the first visual information in the second display area, and when the event occurrence is detected, display third visual information on the second application in the second display area, and wherein the third visual information corresponds to notification information indicating that the occurrence of the event related to the second application is detected.

10. A portable device containing a first body positioned at the center, a second body positioned at one side of the first body, and a third body positioned at another side of the first body, comprising:
- a display unit configured to contain a first display area positioned at the first body, a second display area positioned at the second body, and a third display area positioned at the third body;
- a folding sensor unit configured to detect whether or not the second body is folded on the basis of a first folding axis positioned between the first body and the second body and detect whether or not the third body is folded on the basis of a second folding axis positioned between the first body and the third body; and
- a processor configured to control the display unit and the folding sensor unit,
- wherein the processor is further configured to:
- when the second body and the first body are folded on the basis of the first folding axis, the third body and the first body are folded on the basis of the second folding axis, and the second display area is positioned at the front direction of the portable device, detect a first folded state,
- display first visual information related to a first application in the second display area in the first folded state,
- detect an occurrence of an event related to a second application different from the first application,
- detect whether or not a first folding angle between the first body and the second body is changed,
- display second visual information related to the detected event in at least a partial area of the third display area while continuously displaying the first visual information in the second display area,
- when the event occurrence is detected, display third visual information on the second application in the second display area, and
- when the second visual information is displayed in the at least partial area of the third display area, eliminate the third visual information displayed in the second display area.

11. The portable device of claim 1, wherein when the change of the first folding angle is detected within a threshold time after the occurrence of the event is detected, the processor is further configured to display the second visual information on the event in the at least partial area of the third display area while continuously displaying the first visual information in the second display area.

12. The portable device of claim 11, wherein when the change of the first folding angle is detected not within the threshold time after the occurrence of the event is detected, the processor is further configured to display third visual information related to the first application in the at least partial area of the third display area while continuously displaying the first visual information related to the first application in the second display area.

13. The portable device of claim 12, wherein the third visual information corresponds to detail information on the first application.

14. The portable device of claim 1, further comprising a control input sensing unit configured to detect a control input inputted on at least one of the first display area, the second display area, or the third display area and forward the detected control input to the processor.

15. The portable device of claim 14, wherein when the second visual information is displayed, and a control input for selecting the second visual information is detected, the processor is further configured to display third visual information related to the second application in the second display area.

16. The portable device of claim 1, further comprising a communication unit configured to receive a triggering signal from an external device,
- wherein the processor is further configured to detect the occurrence of the event based on the triggering signal received from the external device.

17. The portable device of claim 1, wherein the event comprises at least one of a voice event, a text message event, a vibration event, or an image event.

18. A method of controlling a portable device containing a first body positioned at the center, a second body positioned at one side of the first body, and a third body positioned at another side of the first body, comprising the steps of:
- when the second body and the first body are folded on the basis of a first folding axis, the third body and the first body are folded on the basis of a second folding axis, and a second display area is positioned at the front direction of the portable device, detecting a first folded state;
- displaying first visual information related to a first application in the second display area in the first folded state;
- detecting an occurrence of an event related to a second application different from the first application in a state that the first visual information is displayed;
- when a change of a first folding angle between the first body and the third body changed on the basis of the second folding axis is detected, displaying second visual information on the event in at least a partial area of a third display area while continuously displaying the first visual information in the second display area;
- setting the at least partial area of the third display area as an event area, the event area is configured by an edge area exposed by the first folding angle; and
- when the first folding angle increases, increasing a size of the event area.

* * * * *